(12) United States Patent
Per et al.

(10) Patent No.: US 11,487,700 B1
(45) Date of Patent: Nov. 1, 2022

(54) SYSTEMS AND METHODS OF CATALOGING USING FILE SYSTEM METADATA

(71) Applicant: Acronis International GmBh, Shaffhausen (CH)

(72) Inventors: Yuri Per, Moscow Region (RU); Serguei M. Beloussov, Costa del Sol (SG); Stanislav Protasov, Moscow (RU); Maxim V. Lyadvinsky, Moscow (RU)

(73) Assignee: ACRONIS INTERNATIONAL GMBH, Shaffhausen (CH)

( * ) Notice: Subject to any disclaimer, the term of this patent is extended or adjusted under 35 U.S.C. 154(b) by 225 days.

(21) Appl. No.: 14/870,977

(22) Filed: Sep. 30, 2015

Related U.S. Application Data (60) Provisional application No. 62/057,970, filed on Sep. 30, 2014.

(51) Int. Cl.
 *G06F 16/11* (2019.01)
 *G06F 16/23* (2019.01)

(52) U.S. Cl.
 CPC ........ *G06F 16/113* (2019.01); *G06F 16/2358* (2019.01)

(58) Field of Classification Search
 CPC ......... G06F 17/30073; G06F 17/30368; G06F 16/113; G06F 16/2358
 See application file for complete search history.

(56) References Cited

U.S. PATENT DOCUMENTS

| | | | |
|---|---|---|---|
| 7,047,380 B2 | 5/2006 | Tormasov et al. | |
| 7,246,211 B1 | 7/2007 | Beloussov et al. | |
| 7,275,139 B1 | 9/2007 | Tormasov et al. | |
| 7,281,104 B1 | 10/2007 | Tsypliaev et al. | |
| 7,318,135 B1 | 1/2008 | Tormasov et al. | |
| 7,353,355 B1 | 4/2008 | Tormasov et al. | |
| 7,366,859 B2 | 4/2008 | Per et al. | |
| 7,475,282 B2 | 1/2009 | Tormasov et al. | |
| 7,603,533 B1 | 10/2009 | Tsypliaev et al. | |
| 7,636,824 B1 | 12/2009 | Tormasov | |
| 7,650,473 B1 | 1/2010 | Tormasov et al. | |
| 7,721,138 B1 | 5/2010 | Lyadvinsky et al. | |
| 7,779,221 B1 | 8/2010 | Tormasov et al. | |
| 7,831,789 B1 * | 11/2010 | Per ..................... | G06F 11/1451 707/625 |
| 7,886,120 B1 | 2/2011 | Tormasov | |
| 7,895,403 B1 | 2/2011 | Tormasov et al. | |

(Continued)

*Primary Examiner* — Alford W Kindred
*Assistant Examiner* — Tiffany Thuy Bui
(74) *Attorney, Agent, or Firm* — K&L Gates LLP (57) ABSTRACT

Systems and methods for data recovery, backup and catalog generation are described. In part, the disclosure relates to a computer-implemented method for generating a data catalog includes creating a current backup archive; obtaining access to a Master File Table (MFT), or other index table such as an Inode Table, of the current backup archive and a MFT, or other index table such as an Inode Table, of a previous backup archive; comparing each entry in the MFT, or Inode Table, of the current backup to each entry of the MFT, or Inode Table, of the previous backup to identify one or more differences in the current backup archive; and saving one or more of the differences into the data catalog of the current backup archive.

16 Claims, 4 Drawing Sheets

(56) References Cited

U.S. PATENT DOCUMENTS

| | | | |
|---|---|---|---|
| 7,934,064 B1 | 4/2011 | Per et al. | |
| 7,937,612 B1 | 5/2011 | Tormasov et al. | |
| 7,949,635 B1 | 5/2011 | Korshunov et al. | |
| 7,953,948 B1 | 5/2011 | Dyatlov et al. | |
| 7,979,690 B1 | 7/2011 | Dyatlov et al. | |
| 8,005,797 B1 | 8/2011 | Chepel et al. | |
| 8,051,044 B1 | 11/2011 | Dyatlov et al. | |
| 8,069,320 B1 | 11/2011 | Per et al. | |
| 8,073,815 B1 | 12/2011 | Korshunov et al. | |
| 8,074,035 B1 | 12/2011 | Per et al. | |
| 8,145,607 B1 | 3/2012 | Korshunov et al. | |
| 8,180,984 B1 | 5/2012 | Per et al. | |
| 8,200,637 B1 * | 6/2012 | Stringham | G06F 11/1451 707/670 |
| 8,225,133 B1 | 7/2012 | Tormasov et al. | |
| 8,261,035 B1 | 9/2012 | Tormasov et al. | |
| 8,296,264 B1 | 10/2012 | Dyatlov et al. | |
| 8,312,259 B1 | 11/2012 | Dyatlov et al. | |
| 8,347,137 B1 | 1/2013 | Chepel et al. | |
| 8,386,733 B1 * | 2/2013 | Tsaur | G06F 11/1458 711/162 |
| 8,397,051 B2 * | 3/2013 | Beaman | G06F 17/3033 711/216 |
| 8,484,427 B1 | 7/2013 | Lyadvinsky et al. | |
| 8,645,748 B1 | 2/2014 | Chepel et al. | |
| 8,732,121 B1 | 5/2014 | Zorin et al. | |
| 8,849,777 B1 * | 9/2014 | Xing | G06F 17/30088 707/640 |
| 8,856,927 B1 | 10/2014 | Beloussov et al. | |
| 8,930,423 B1 * | 1/2015 | Surampudi | G06F 16/188 707/821 |
| 8,990,162 B1 * | 3/2015 | Kushwah | G06F 11/1451 707/646 |
| 8,996,830 B1 | 3/2015 | Lyadvinsky et al. | |
| 9,332,083 B2 * | 5/2016 | Gao | G06F 15/167 |
| 9,569,446 B1 * | 2/2017 | Feathergill | G06F 17/30088 |
| 9,841,909 B2 * | 12/2017 | Zhu | G06F 3/0617 |
| 9,916,112 B1 * | 3/2018 | Taylor | G06F 3/065 |
| 10,474,534 B1 * | 11/2019 | Rangapuram | G06F 11/1451 |
| 2006/0225065 A1 | 10/2006 | Chandhok et al. | |
| 2007/0198659 A1 * | 8/2007 | Lam | G06F 11/1451 709/219 |
| 2008/0259922 A1 * | 10/2008 | White | H04L 41/082 370/392 |
| 2010/0011178 A1 | 1/2010 | Feathergill | |
| 2011/0225141 A1 * | 9/2011 | Chaudhry | G06F 17/30132 707/709 |
| 2013/0246362 A1 * | 9/2013 | Patwardhan | G06F 17/30212 707/646 |
| 2014/0052700 A1 * | 2/2014 | VanderSpek | G06F 17/30162 707/693 |
| 2014/0188808 A1 * | 7/2014 | Wolf | G06F 17/30289 707/654 |
| 2014/0279846 A1 * | 9/2014 | Srinivasan | G06F 17/30011 707/608 |

* cited by examiner

SYSTEMS AND METHODS OF CATALOGING USING FILE SYSTEM METADATA

CROSS-REFERENCE TO RELATED APPLICATIONS

This application claims priority to and the benefit of U.S. provisional patent application No. 62/057,970, filed on Sep. 30, 2014, the disclosure of which is herein incorporated by reference in its entirety.

FIELD OF THE INVENTION

The technical field may generally relate to the backup of data, and more particularly to resolving high computing resource load issues that occur while building a list of changed files for a data catalog from disk-level backups.

BACKGROUND

Currently, there are a number of conventional methods that relate to organization of data archiving. One of these is a backup of the entire hard drive, which typically involves copying of the hard drive content onto some other medium, such as another hard disk drive, a DVD ROM, a DVD RAM, a flash disk, etc. The primary disadvantage of such a method is the need to backup what is frequently a very large amount of data, which, on the one hand, results in a relatively lengthy process of archiving. In addition, another issue with such a method is that it frequently requires relatively large available space for the archived data. This ultimately results in a relatively high cost of archiving per unit of archived data.

Another approach is often referred to as "incremental backup," which generally decreases the amount of space required for the archiving. With the incremental backup, typically the contents of the hard disk drive are archived, or stored somewhere once. After that, only that data that has been changed, or added, since the previous backup, or since the pervious incremental backup, is actually archived. Recovery of data from the archive typically involves merging of the original backup and the various incremental backups. A catalog may be created to present a list of all saved versions of a specific file. The catalog may be used to find a file with an unknown path or to find a file which is absent in the last backup. Catalogs may not be required to restore a backup or to browse files of a specific backup version.

When a disk-level backup is created, updating the catalog with information related to the changed, added, or deleted files usually consumes much of the computer resources as all the file information for the data catalog is gathered by reading all this information from the backup just created.

Accordingly a need therefore exists for methods of building a data catalog that are more efficient relative to standard tree processing based approaches.

BRIEF SUMMARY

The details of one or more implementations are set forth in the accompanying drawings and the description below. Other features and advantages will become apparent from the description, the drawings, and the claims.

Systems and methods for data recovery, backup and catalog generation are described. By comparing the lists of files and their attributes in the Master File Tables (MFTs) in a current and the previous backups, it is possible to save computer resources when building the data catalog. In part, the disclosure relates to a computer-implemented method for generating a data catalog includes creating, by a processor, a current backup archive; obtaining, by the processor, access to a Master File Table (MFT) of the current backup archive and a MFT of a previous backup archive; comparing, by the processor, each entry in the MFT of the current backup to each entry of the MFT of the previous backup to identify one or more differences in the current backup archive; and saving, by the processor, one or more of the differences into the data catalog of the current backup archive.

In part, the disclosure relates to a computer-implemented method for generating a data catalog. The method includes accessing, by a processor, a current backup archive; obtaining, by the processor, access to a Master File Table (MFT) of the current backup archive and a MFT of a previous backup archive; comparing, by the processor, each entry in the MFT of the current backup to each entry of the MFT of the previous backup to identify one or more differences in the current backup archive; and saving, by the processor, one or more of the differences into the data catalog of the current backup archive.

In one embodiment, the method further includes generating, by the processor, a list of files that are new, deleted, and/or changed in the MFT of the current backup as compared to the MFT of the previous backup using the one or more differences. In one embodiment, the method further includes copying, by the processor, a catalog of previous backup archive to a catalog of current backup archive. In one embodiment, the method further includes retrieving, by the processor, a list of files and file attributes from the MFT of previous backup archive and retrieving a list of files and file attributes from the MFT of the current backup archive.

In one embodiment, the method further includes determining, by the processor, whether files in the MFT of previous backup archive do not exist on the MFT of current backup archive. In one embodiment, the method further includes deleting, by the processor, from the data catalog files in the MFT of previous backup archive do not exist on the MFT of current backup archive.

In one embodiment, the method further includes the determining, by the processor, whether files in the MFT of current backup archive do not exist on the MFT of previous backup archive. In one embodiment, the method further includes writing, by the processor, to the catalog files in the MFT of current backup archive that do not exist on the MFT of previous backup archive. In one embodiment, the method further includes determining, by the processor, whether files exist in both the MFT of current backup archive and the MFT of previous backup archive.

In one embodiment, the method further includes comparing, by the processor, the attributes of files that exist in both the MFT of the current backup archive and the MFT of the previous backup archive. In one embodiment, the method further includes writing, by the processor, files with attributes that are different in the MFT of the current backup archive as compared to the attributes for the same file in the MFT of the previous backup archive to the data catalog. In one embodiment, the current backup archive was previously generated by a third party application. In one embodiment, comparing includes comparing cached versions of the MFTs created during backup.

In part, the disclosure relates to a computer-implemented method for generating a data catalog. The method includes accessing, by a processor, a current backup archive; obtaining, by the processor, access to a Master File Table (MFT)

of the current backup archive and a MFT of a previous backup archive; comparing, by the processor, one or more hash records obtained from the MFT of the current backup to one or more hash records obtained from the MFT of the previous backup to identify one or more differences in the current backup archive; and saving, by the processor, one or more of the differences into the data catalog of the current backup archive.

In one embodiment, the method further includes: splitting the MFTs into corresponding split regions; comparing hash records of the split regions of the MFT of the current backup with the corresponding hash records of the split regions of the MFT of the previous backup; and performing a later full comparison of the corresponding split regions with subsequently changed hashes.

In part, the disclosure relates to a computer-implemented method for generating a data catalog. The method includes accessing, by a processor, a current backup archive; obtaining, by the processor, access to an inode table of the current backup archive and an inode table of a previous backup archive; comparing, by the processor, each entry in the inode table of the current backup to each entry of the inode table of the previous backup to identify one or more differences in the current backup archive; and saving, by the processor, one or more of the differences into the data catalog of the current backup archive.

In part, the disclosure relates to a computer-implemented method for generating a data catalog. The method includes accessing, by a processor, a current backup archive; obtaining, by the processor, access to an inode table of the current backup archive and an inode table of a previous backup archive; comparing, by the processor, one or more hash records obtained from the inode table of the current backup to one or more hash records obtained from the inode table of the previous backup to identify one or more differences in the current backup archive; and saving, by the processor, one or more of the differences into the data catalog of the current backup archive.

DETAILED DESCRIPTION

Overview

A user may institute backup/recovery and cataloging procedures to ensure persistence of applications, data, or other resources accessed through one or more machines such as computing devices. In one embodiment, the machine can be a virtual machine. Each machine or computing device, whether physical or virtual can run applications such as databases, user applications and other software. In part, the disclosure relates to methods of backing up and restoring such applications, files and other data stored on or otherwise used by such machines. In addition, the application relates to cataloging, in the context of backup/recovery and cataloging software. For example, a backup archive of a machine may be created and stored onsite or offsite and may include the entire content of the physical or virtual machine before it failed. Efficient recovery of machines may be critical for proper business or other operations of an organization as application demands are likely to continue in the event of a physical or virtual machine failure.

Figure 1:
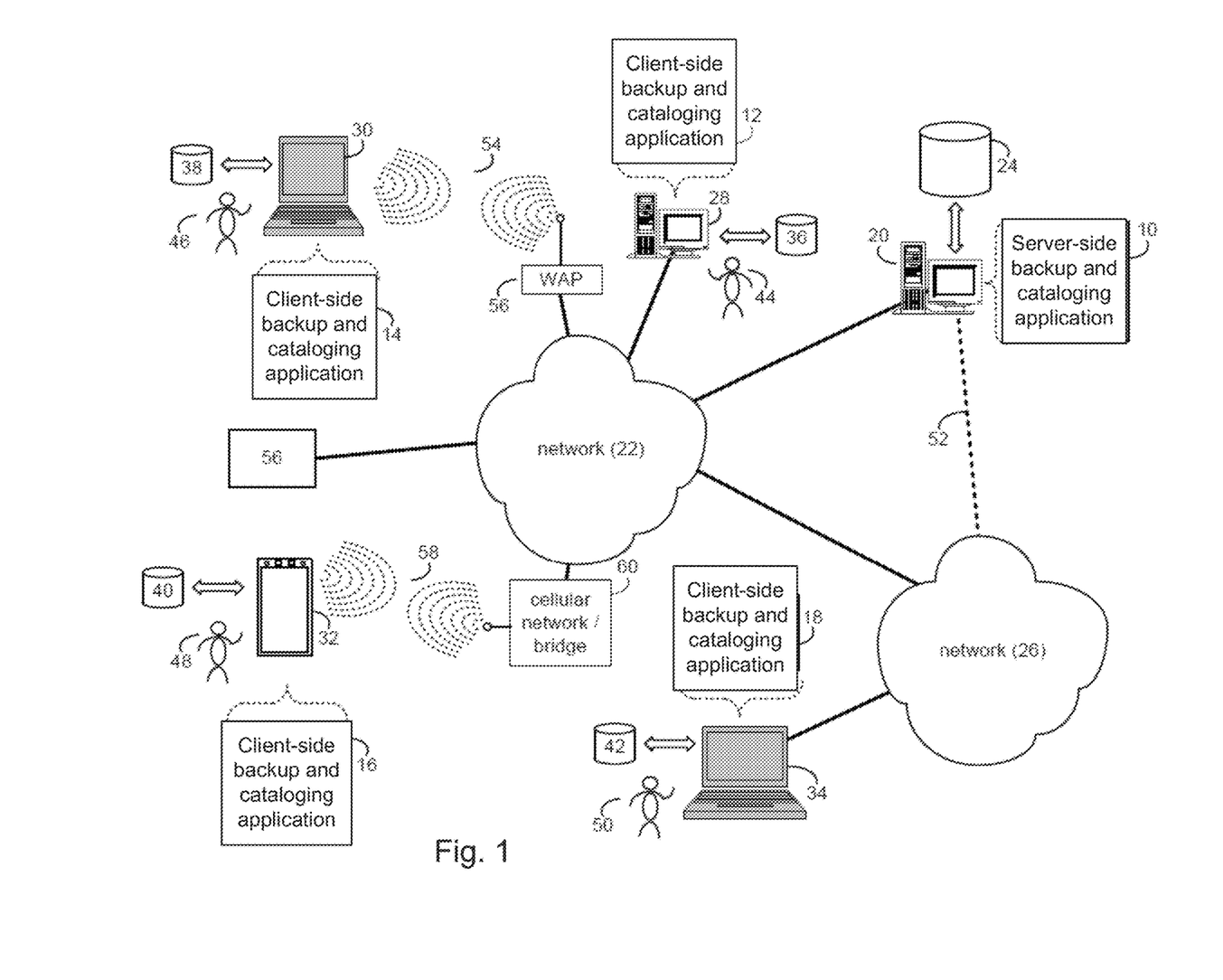
FIG. 1 depicts an example system that can execute implementations of the present disclosure.

The present disclosure relates to a method of cataloging by using file system metadata. Various data backup and cataloging processes can be used as shown in FIG. 1. Embodiments of the disclosure are suitable for use with various file systems without limitations such as the NTFS files systems as well Linux and Unix files systems. In NTFS, all file, directory and metafile data—file name, creation date, access permissions (by the use of access control lists), and size—are stored as metadata in the Master File Table (MFT). Similarly, with regard to Linux/Unix file systems the same information is stored in an inode table. References to MFTs or inode tables can be used interchangeably or substituted for each other as used herein. This follows because the embodiments of the invention can be extended to various file systems that store or index metadata in table, file or other format or representation.

In general, a first and a second archive and a first and a second Master File Tables (MFT), alternatively a first and second inode table can also be used for the applicable file systems, are used to generate a catalog based upon an analysis of difference in the respective MFTs (or inode tables). Cataloging may be started when an up-to-date, current backup has been successfully created. The current backup may be created using an image backup process. The image backup process may check whether the previous backup is available. If the previous backup is available, the MFT data in the previous and current backups may be compared to find which files and file attributes were created and/or updated and/or deleted between these two backups. The resultant list of changed files and file attributes is written to the catalog. If the previous backup is not available, the entire list of files and file attributes from the current backup is written to the catalog.

Current backup processes may generate the data catalog anew on creation of each backup by analyzing all the data in a newly created backup, even if no or few changes were made since the last backup. Analyzing which data is to be changed and/or added and/or removed in a newly created backup and in the backed up source may require more computing resources than is required to use existing information available in MFT files of current and previous backups.

When executing a disk-level backup, updating the catalog with information regarding what data was changed and/or added, and/or delete may consume a great deal of computer resources. The load on the computing resources occurs because all of the file information for the catalog is gathered by reading the information from the backup just created. The process of reading a file system may be time and resourcing computing because the file structure typically has a tree structure, which may be stored in an archive or on a disk in a random fashion. Thus reading the file system may necessitate random access to the archive or disk. Comparing lists of files and their attributes derived from MFTs in the current and previous backups is relatively less computer intensive, and reduces the load on computing resources when building the data catalog.

Incremental backups generally have fewer changes between them, even more so when the incremental backups are created frequently. An incremental backup generally describes a backup that only contains changes from a base backup, or a previous incremental backup. The MFT in a backup may be an image of the MFT on the original file system. The size difference between MFTs in two consecutive incremental backups may be much smaller than a full MFT size. In some situations, comparing such MFTs can be performed quickly. In other situations in which it is known that the number of changes between two backups was small, comparison of MFTs can also be faster than reading the backups to determine what changed between them.

In view of the forgoing, there is a need for a system employing the MFTs of backups in order to more efficiently generate the data catalog. The various techniques described herein can be used with various types of backup systems for backing up portions of a file system, entire files systems, and/or entire disks.

Referring to FIG. 1, there is shown a server-side backup/recovery and cataloging application 10 and client-side database backup/recovery and cataloging applications 12, 14, 16, and 18. Server application 10 and/or one or more of client applications 12, 14, 16, and/or 18 may execute one or more processes configured to carry out one or more of the features described herein. Server application 10 may be referred to as a process configured to carry out one or more of the features described herein, such as file restoration process 10.

Further, one or more of client applications 12, 14, 16, and 18 may be referred to as a process configured to carry out one or more of the features described herein, such as backup/recovery and cataloging processes 12, 14, 16, and/or 18. The backup and restore processes described herein can be used with various suitable transactional systems that use one or more databases such as journaling systems with an email exchange system being an example thereof.

The backup/recovery and cataloging process may be a server-side process (e.g., server-side file restoration process 10), a client-side process (e.g., client-side backup/recovery and cataloging process 12, client-side backup/recovery and cataloging process 14, client-side backup/recovery and cataloging process 16, or client-side backup/recovery and cataloging process 18), or a hybrid server-side/client-side process (e.g., a combination of server-side backup/recovery and cataloging process 10 and one or more of client-side backup/recovery and cataloging processes 12, 14, 16, 18).

System Overview

Referring to FIG. 1, server-side backup/recovery and cataloging process 10 may reside on and may be executed by server computer 20, which may be in communication with network 22 (e.g., the Internet or a local area network). Examples of server computer 20 may include, but are not limited to: a personal computer, a server computer, a series of server computers, a mini computer, and/or a mainframe computer.

The server computer 20 may be a distributed system and the operations of server computer 20 may execute on one or more processors, simultaneously and/or serially. For example, server computer 20 may be a symbolic representation of a cloud computing site, cloud environment, or cloud platform running multiple servers, computers, or virtual machines (e.g., a virtual machine host computer). Server computer 20 may execute one or more operating systems, examples of which may include but are not limited to: Microsoft Windows Server™; Novell Netware™; Redhat Linux™, Unix, or a custom operating system, for example.

The instruction sets and subroutines of server-side file restoration process 10, which may be stored on storage device 24 coupled to server computer 20, may be executed by one or more processors (not shown) and one or more memory architectures (not shown) incorporated into server computer 20. Storage device 24 may include but is not limited to: a hard disk drive; a tape drive; an optical drive; a solid state storage device; a RAID array; a random access memory (RAM); and a read-only memory (ROM).

Server computer 20 may execute a web server application that allows for access to server computer 20 (via network 22) using one or more protocols, examples of which may include but are not limited to HTTP (i.e., HyperText Transfer Protocol). Network 22 may be in communication with one or more secondary networks (e.g., secondary network 26), examples of which may include but are not limited to: a local area network; a wide area network; or an intranet, for example.

Client-side backup/recovery and cataloging processes 12, 14, 16, 18 may reside on and may be executed by client electronic devices 28, 30, 32, and/or 34 (respectively), examples of which may include but are not limited to personal computer 28, a television with one or more processors embedded therein or coupled thereto (not shown), laptop computer 30, data-enabled mobile telephone 32, notebook computer 34, a tablet (not shown), and a personal digital assistant (not shown), for example. Client electronic devices 28, 30, 32, and/or 34 may each be in communication with network 22 and/or secondary network 26 and may each execute an operating system, examples of which may include but are not limited to Apple iOS™, Microsoft Windows™, Android™, Redhat Linux™, or a custom operating system.

The instruction sets and subroutines of client-side backup/recovery and cataloging processes 12, 14, 16, 18, which may be stored on storage devices 36, 38, 40, 42 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Storage devices 36, 38, 40, 42 may include but are not limited to: hard disk drives; tape drives; optical drives; solid state storage devices; RAID arrays; random access memories (RAM); read-only memories (ROM); compact flash (CF) storage devices; secure digital (SD) storage devices; and memory stick storage devices.

Client-side backup/recovery and cataloging processes 12, 14, 16, 18 and/or server-side backup/recovery and cataloging process 10 may be processes that run within (i.e., are part of) a cloud computing site, cloud computing application, cloud platform, or cloud environment. Alternatively, backup/recovery and cataloging processes 12, 14, 16, 18 and/or server-side backup/recovery and cataloging process 10 may be stand-alone applications that work in conjunction with the cloud computing site, cloud computing application, cloud platform, or cloud environment. One or more of client-side backup/recovery and cataloging processes 12, 14, 16, 18 and server-side backup/recovery and cataloging process 10 may interface with each other (via network 22 and/or secondary network 26).

Users 44, 46, 48, 50 may access server-side backup/recovery and cataloging process 10 directly through the device on which the client-side backup/recovery and cataloging process (e.g., client-side file restoration processes 12, 14, 16, 18) is executed, namely client electronic devices 28, 30, 32, 34, for example. Users 44, 46, 48, 50 may access server-side backup/recovery and cataloging process 10 directly through network 22 and/or through secondary network 26. Further, server computer 20 (i.e., the computer that executes server-side backup/recovery and cataloging process 10) may be in communication with network 22 through secondary network 26, as illustrated with phantom link line 52.

The various client electronic devices may be directly or indirectly coupled to network 22 (or secondary network 26). For example, personal computer 28 is shown directly coupled to network 22 via a hardwired network connection. Further, notebook computer 34 is shown directly coupled to secondary network 26 via a hardwired network connection. Laptop computer 30 is shown wirelessly coupled to network 22 via wireless communication channel 54 established between laptop computer 30 and wireless access point (i.e., WAP) 56, which is shown directly coupled to network 22. WAP 56 may be, for example, an IEEE 802.11a, 802.11b, 802.11g, 802.11n, Wi-Fi, and/or Bluetooth device that is capable of establishing a wireless communication channel 54 between laptop computer 30 and WAP 56. Data-enabled mobile telephone 32 is shown wirelessly coupled to network 22 via wireless communication channel 58 established between data-enabled mobile telephone 32 and cellular network/bridge 60, which is shown directly coupled to network 22.

All of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth is a telecommunications industry specification that allows e.g., mobile phones, computers, and personal digital assistants to be interconnected using a short-range wireless connection.

Backup/Recovery and Cataloging Processes

A data catalog is a user-friendly representation of backed up content. Users can interact with the data catalog in the same way as users interact with data in the native environment. For example, the backed up files and folders are represented in the data catalog as a file/folder tree with folders, sub-folders and files.

File system metadata is the information about the files and their attributes, which may be stored in a packed binary format, and which may be represented as a table with columns. For example, in the NTFS file system such a table is called the Master File Table (MFT). In addition to a base file record for a specific file, a MFT may include more records for the same file, which may be called extension file records. The MFT describes all files on a volume, and file attributes include file names, timestamps, stream names, lists of cluster numbers where data streams reside, indexes, security identifiers, and/or file attributes such as "read only", "compressed", "encrypted", etc., among others. The MFT is a system file and is generally hidden from the user. NTFS otherwise treats system files as ordinary files, and thus they can be located anywhere on a volume.

A list of changed files represents a structured table of files and their physical addresses on a file system on disk. This list may be generated by reading the file structure. The list of changed files may contain, for example, the following:

DIR1/DIR2/FILE1 (Size=N1, Modification Time= T1 . . . )

DIR3/DIR4/FILE2 (Size=N2, Modification Time= T2 . . . )

The list of changed files is generated during the cataloging process by comparing MFT fields in the previous and current backups.

Figure 2:
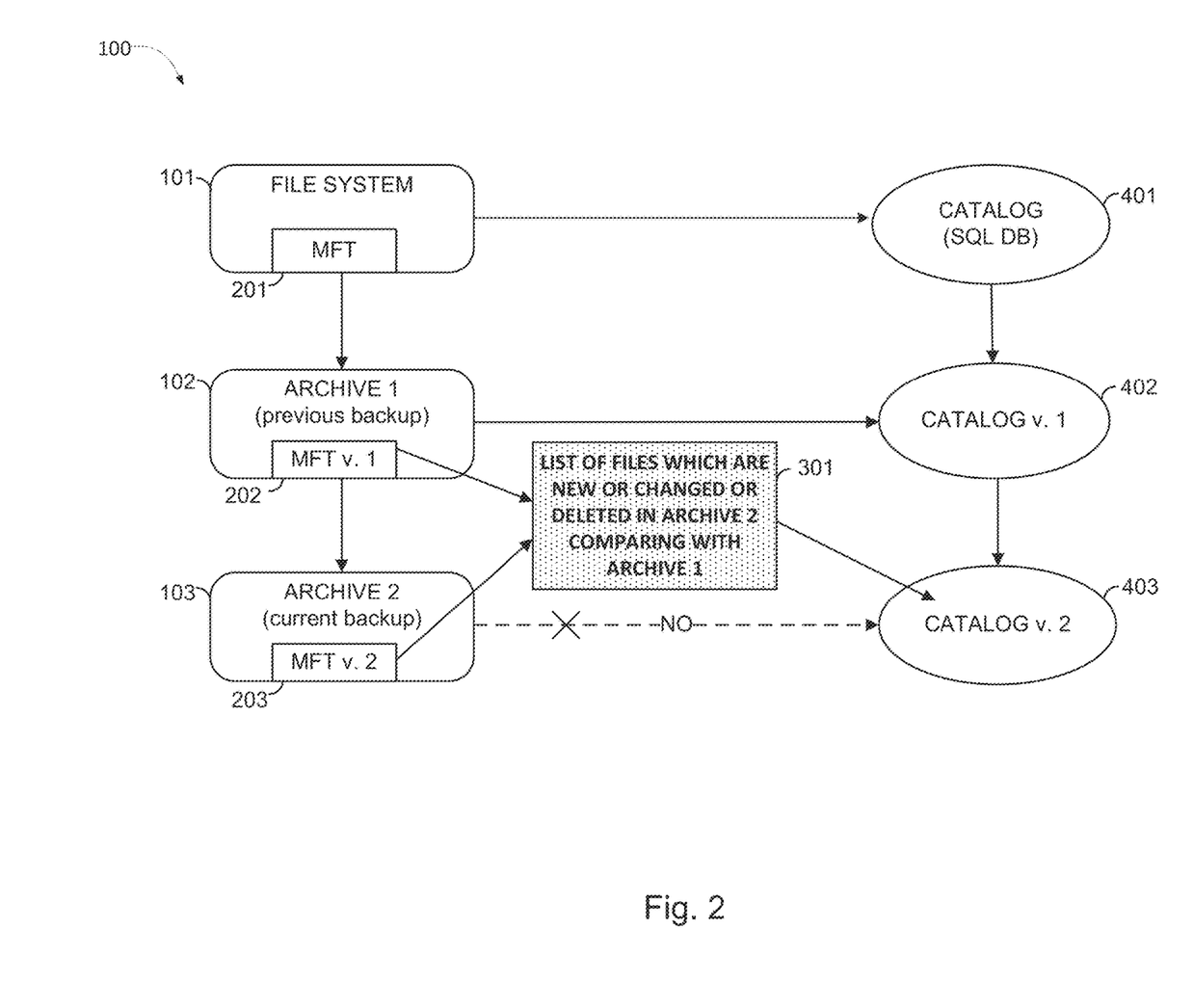
FIG. 2 depicts an example system that can execute implementations of the present disclosure with respect to a first and a second archive and a first and a second data catalog.

FIG. 2 illustrates generally a process 100 for generating sequential backups 102, 103 of a file system 101, and also and embodiment for how those backups maybe used to generate and/or update a catalog of files in a backup. One or more previous backups 102 of the file system 101 may have been generated in the past. The most recent backup is considered the current backup 103. The file system 101 includes an MFT 201 describing the files in the file system. Previous backups 102 each also include an MFT 202 describing the contents of each previous backup 102. Likewise, the current backup 103 also includes an MFT 203. As note previously, the term MFT can be replaced with inode table and other metadata indexes such that the methods of the disclosure are file system agnostic.

The process 100 of generating and/or updating a catalog begins when the current backup 103 is successfully created. The current backup 103 includes an MFT 203. Upon completion of generating the current backup 103, the process 100 may determine whether a previous backup 102 exists. When no previous backup 102 exists, the process 100 may read the current backup's 103 MFT 203 and placed the list of all files in the current back up 103 in the catalog 403. The catalog 403 generated in this manner may be the first instance of the catalog. Alternatively or additionally, the process 100 may have previously or concurrently generated a base catalog 401 from the file system's 101 MFT 201. In this situation, the process 100 may update the base catalog 401 with information from the MFT 203 of the current backup 103. The catalog may be stored in any number of formats, such as for example as a SQL database.

When a previous backup 102 does exist, the process 100 may read the MFT 202 from the previous backup 102 and compare it against the MFT 203 of the current backup 103. Files that were added and/or changed/and/or deleted in the current backup 101 as compared to the previous backup 102 are listed 301 and added to the current catalog 403. The current catalog 403 may be an updated version of a previous catalog 402, which itself may have been an update of a base catalog 401.

Figure 3:
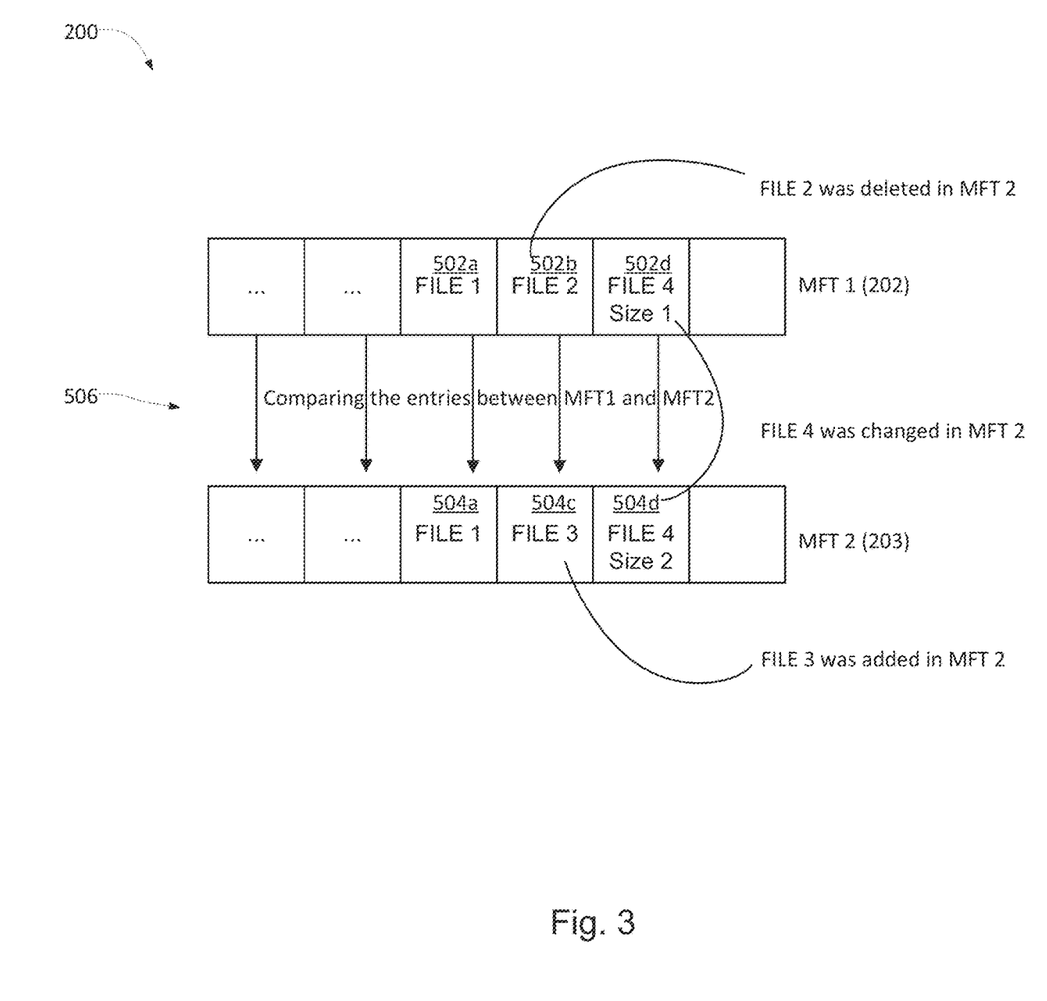
FIG. 3 depicts an example method that efficiently evaluates entries between a first MFT and a second MFT according to an embodiment of the disclosure.

FIG. 3 illustrates a process 200 for comparing two MFT's, such as the previous MFT 202 and the current MFT 203 of FIG. 2. As illustrated in FIG. 3, a first MFT 202 includes descriptions for a number of files 502a-502d. Similarly, a second MFT 203 also includes descriptions for number of files 504a-504d. The process 200 compares the first MFT 202 and the second MFT 203 reading the list of files and their attributes from both. Concurrently and/or thereafter, the process 200 compares 506 the file descriptions from each list.

FIG. 3 illustrates various examples of what may result from the comparison 506. The comparison 506 may find files that exist in both the first MFT 202 and the second MFT 203 that are unchanged. For example, the description of file1 502a of the first MFT 202 is unchanged from the description of file1 504a in the second MFT.

The comparison 506 may also find files that exist in the first MFT 202 that do not exist in the second MFT. For example, the description of file2 502b in the first MFT 202 is absent from the second MFT 203. This indicates that file2 502b was deleted before the generation of the second MFT 203, and thus should be deleted from the catalog, and/or marked as deleted.

The comparison 506 may also find files that exist in the second MFT 203 that do not exist in the first MFT 202. For example, file3 504c in the second MFT 203 does not exist in the first MFT 202. This indicates that file 2 504c was added before the second MFT 203 was generated, and thus file2 504*c* should be added to the catalog.

The comparison 506 may also find files that exist in both MFTs 202, 203, but that have changed attributes. For example, file4 502*d* in the first MFT 202 has an attribute indicating a size of one. The same file4 504*d* in the second MFT 203 has an attribute indicating a size of two. The attributes of file4 502*d*, 504*d* should thus be updated (size now is two) in the catalog, and/or be marked as updated.

In some embodiments, the processes 100, 200 of FIGS. 2 and 3 may be executed entirely in volatile memory, which is generally a very efficient manner in which to execute such a process. In some embodiments, the processes 100, 200 may be partially executed with non-volatile memory. For example, in cases where the MFTs 202, 203 and/or the list of changes 301 are quite large, parts or all of each may be stored in non-volatile memory.

The process 100 of FIG. 2 may be applied to backups of any kind. For example, the process 100 may be applied to disk-level backups and/or file-level backups. The process 100 may also be able to find the MFTs in any location, such as for instance in the reserved space of a backup. The process 100 is applicable to both physical and virtual machines.

Figure 4:
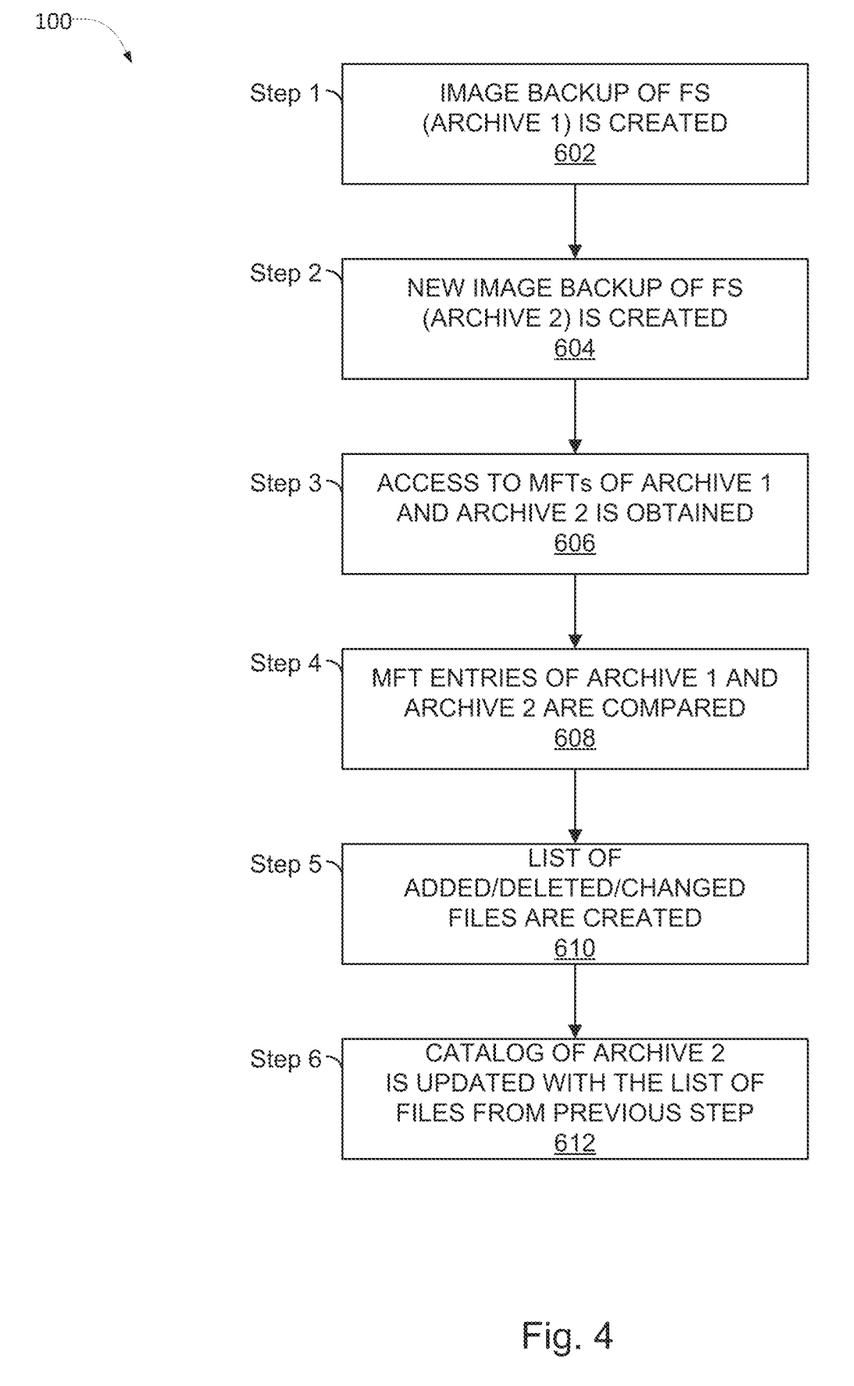
FIG. 4 depicts an example flowchart of a method suitable for generating a data catalog of an archive based upon the processing and evaluate of the MFTs of two archives.

FIG. 4 further illustrates an embodiment of the process 100 of FIG. 2 for updating a data catalog. As illustrated in FIG. 4, at step 1 of the process 100, an image backup of a file system is created 602 (first archive). At step 2 and at some later point, a new image backup of the file system is created 604 (second archive). At step 3, the process 100 obtains access 606 to the MFTs of both the first archive and the second archive. At step 4, the entries in each MFT are compared 608. At step 5, a list of added and/or deleted and/or changed files is created 610 from the comparison 608. The list is then used at step 6 to update 612 the catalog, which, because it was generated with the generation of the second archive, is associated with the second archive.

In an embodiment, comparison of a MFT may be performed not only by direct comparison of data from archives but may also be performed by comparison of cached versions of the MFT created during backup. Further, comparison of the MFT may be performed by splitting the MFT into regions, comparing hashes of those regions, and later performing a full comparison only of the regions with changed hashes. For example, the MFTs may be split into corresponding split region. Further, hash records of the split regions of the MFT of the current backup may be compared with the corresponding hash records of the split regions of the MFT of the previous backup. A later full comparison of the split regions maybe performed only of the regions with subsequently changed hashes.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

In various embodiments, modules or software can be used to practice certain aspects of the invention. For example, software-as-a-service (SaaS) models or application service provider (ASP) models may be employed as software application delivery models to communicate software applications to clients or other users. Such software applications can be downloaded through an Internet connection, for example, and operated either independently (e.g., downloaded to a laptop or desktop computer system) or through a third-party service provider (e.g., accessed through a third-party web site). In addition, cloud computing techniques may be employed in connection with various embodiments of the invention. In certain embodiments, a "module" may include software, firmware, hardware, or any reasonable combination thereof.

Various embodiments of the systems and methods may include and/or utilize a computer device. In various embodiments, a computer may be in communication with a server or server system utilizing any suitable type of communication including, for example, wired or wireless digital communications. In some embodiments, the server or server system may be implemented as a cloud computing application or in a similar manner and may provide various functionality of the systems and methods as SaaS.

The examples presented herein are intended to illustrate potential and specific implementations of the present invention. The examples are intended primarily for purposes of illustration of the invention for those skilled in the art. No particular aspect or aspects of the examples are necessarily intended to limit the scope of the present invention.

The figures and descriptions of the present invention have been simplified to illustrate elements that are relevant for a clear understanding of the present invention, while eliminating, for purposes of clarity, other elements. Those of ordinary skill in the art may recognize, however, that these sorts of focused discussions would not facilitate a better understanding of the present invention, and therefore, a more detailed description of such elements is not provided herein.

The processes associated with the present embodiments may be executed by programmable equipment, such as computers. Software or other sets of instructions that may be employed to cause programmable equipment to execute the processes may be stored in any storage device, such as, for example, a computer system (non-volatile) memory, an optical disk, magnetic tape, or magnetic disk. Furthermore, some of the processes may be programmed when the computer system is manufactured or via a computer-readable memory medium.

It can also be appreciated that certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A computer-readable medium may also include memory storage that may be physical, virtual, permanent, temporary, semi-permanent and/or semi-temporary.

A "computer," "computer system," "component," "computer device," or "processor" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein may include memory for storing certain software applications used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable memory media. In various embodiments, a "host," "engine," "loader," "filter," "platform," or "component" may include various computers or computer systems, or may include a reasonable combination of software, firmware, and/or hardware.

In various embodiments of the present invention, a single component may be replaced by multiple components, and multiple components may be replaced by a single component, to perform a given function or functions. Except where such substitution would not be operative to practice embodiments of the present invention, such substitution is within the scope of the present invention. Any of the servers, for example, may be replaced by a "server farm" or other grouping of networked servers (e.g., a group of server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

In general, it may be apparent to one of ordinary skill in the art that various embodiments described herein, or components or parts thereof, may be implemented in many different embodiments of software, firmware, and/or hardware, or modules thereof. The software code or specialized control hardware used to implement some of the present embodiments is not limiting of the present invention. For example, the embodiments described hereinabove may be implemented in computer software using any suitable computer programming language such as .NET, SQL, MySQL, or HTML using, for example, conventional or object-oriented techniques. Programming languages for computer software and other computer-implemented instructions may be translated into machine language by a compiler or an assembler before execution and/or may be translated directly at run time by an interpreter.

Examples of assembly languages include ARM, MIPS, and x86; examples of high level languages include Ada, BASIC, C, C++, C#, COBOL, Fortran, Java, Lisp, Pascal, Object Pascal; and examples of scripting languages include Bourne script, JavaScript, Python, Ruby, PHP, and Perl. Various embodiments may be employed in a Lotus Notes environment, for example. Such software may be stored on any type of suitable computer-readable medium or media such as, for example, a magnetic or optical storage medium. Thus, the operation and behavior of the embodiments are described without specific reference to the actual software code or specialized hardware components. The absence of such specific references is feasible because it is clearly understood that artisans of ordinary skill would be able to design software and control hardware to implement the embodiments of the present invention based on the description herein with only a reasonable effort and without undue experimentation.

Various embodiments of the systems and methods described herein may employ one or more electronic computer networks to promote communication among different components, transfer data, or to share resources and information. Such computer networks can be classified according to the hardware and software technology that is used to interconnect the devices in the network, such as optical fiber, Ethernet, wireless LAN, HomePNA, power line communication or G.hn. The computer networks may also be embodied as one or more of the following types of networks: local area network (LAN); metropolitan area network (MAN); wide area network (WAN); virtual private network (VPN); storage area network (SAN); or global area network (GAN), among other network varieties.

For example, a WAN computer network may cover a broad area by linking communications across metropolitan, regional, or national boundaries. As the systems and methods described herein aim to minimize I/O transactions, they may be useful in situations, such as cloud computing configurations, where I/O transactions are performed over a WAN or other network with long I/O delays. The network may use routers and/or public communication links. One type of data communication network may cover a relatively broad geographic area (e.g., city-to-city or country-to-country) which uses transmission facilities provided by common carriers, such as telephone service providers.

In another example, a GAN computer network may support mobile communications across multiple wireless LANs or satellite networks. In another example, a VPN computer network may include links between nodes carried by open connections or virtual circuits in another network (e.g., the Internet) instead of by physical wires. The link-layer protocols of the VPN can be tunneled through the other network. One VPN application can promote secure communications through the Internet. The VPN can also be used to separately and securely conduct the traffic of different user communities over an underlying network. The VPN may provide users with the virtual experience of accessing the network through an IP address location other than the actual IP address which connects the access device to the network.

The computer network may be characterized based on functional relationships among the elements or components of the network, such as active networking, client-server, or peer-to-peer functional architecture. The computer network may be classified according to network topology, such as bus network, star network, ring network, mesh network, star-bus network, or hierarchical topology network, for example. The computer network may also be classified based on the method employed for data communication, such as digital and analog networks.

Embodiments of the methods, systems, and tools described herein may employ internetworking for connecting two or more distinct electronic computer networks or network segments through a common routing technology. The type of internetwork employed may depend on administration and/or participation in the internetwork. Non-limiting examples of internetworks include intranet, extranet, and Internet. Intranets and extranets may or may not have connections to the Internet. If connected to the Internet, the intranet or extranet may be protected with appropriate authentication technology or other security measures. As applied herein, an intranet can be a group of networks which employ Internet Protocol, web browsers and/or file transfer applications, under common control by an administrative entity. Such an administrative entity could restrict access to the intranet to only authorized users, for example, or another internal network of an organization or commercial entity. As applied herein, an extranet may include a network or internetwork generally limited to a primary organization or entity, but which also has limited connections to the networks of one or more other trusted organizations or entities (e.g., customers of an entity may be given access an intranet of the entity thereby creating an extranet).

Computer networks may include hardware elements to interconnect network nodes, such as network interface cards (NICs) or Ethernet cards, repeaters, bridges, hubs, switches, routers, and other like components. Such elements may be physically wired for communication and/or data connections may be provided with microwave links (e.g., IEEE 802.12) or fiber optics, for example. A network card, network adapter or NIC can be designed to allow computers to communicate over the computer network by providing physical access to a network and an addressing system through the use of MAC addresses, for example. A repeater can be embodied as an electronic device that receives and retransmits a communicated signal at a boosted power level to allow the signal to cover a telecommunication distance with reduced degradation. A network bridge can be configured to connect multiple network segments at the data link layer of a computer network while learning which addresses can be reached through which specific ports of the network. In the network, the bridge may associate a port with an address and then send traffic for that address only to that port. In various embodiments, local bridges may be employed to directly connect local area networks (LANs); remote bridges can be used to create a wide area network (WAN) link between LANs; and/or, wireless bridges can be used to connect LANs and/or to connect remote stations to LANs.

In various embodiments, a hub may be employed which contains multiple ports. For example, when a data packet arrives at one port of a hub, the packet can be copied unmodified to all ports of the hub for transmission. A network switch or other devices that forward and filter OSI layer 2 datagrams between ports based on MAC addresses in data packets can also be used. A switch can possess multiple ports, such that most of the network is connected directly to the switch, or another switch that is in turn connected to a switch. The term "switch" can also include routers and bridges, as well as other devices that distribute data traffic by application content (e.g., a Web URL identifier or other data location information as described herein). Switches may operate at one or more OSI model layers, including physical, data link, network, or transport (i.e., end-to-end). A device that operates simultaneously at more than one of these layers can be considered a multilayer switch. In certain embodiments, routers or other like networking devices may be used to forward data packets between networks using headers and forwarding tables to determine an optimum path through which to transmit the packets.

As employed herein, an application server may be a server that hosts an API to expose business logic and business processes for use by other applications. Examples of application servers include J2EE or Java EE 5 application servers including WebSphere Application Server. Other examples include WebSphere Application Server Community Edition (IBM), Sybase Enterprise Application Server (Sybase Inc), WebLogic Server (BEA), JBoss (Red Hat), JRun (Adobe Systems), Apache Geronimo (Apache Software Foundation), Oracle OC4J (Oracle Corporation), Sun Java System Application Server (Sun Microsystems), and SAP Netweaver AS (ABAP/Java).

Also, application servers may be provided in accordance with the .NET framework, including the Windows Communication Foundation, .NET Remoting, ADO.NET, and ASP.NET among several other components. For example, a Java Server Page (JSP) is a servlet that executes in a web container which is functionally equivalent to CGI scripts. JSPs can be used to create HTML pages by embedding references to the server logic within the page. The application servers may mainly serve web-based applications, while other servers can perform as session initiation protocol servers, for instance, or work with telephony networks. Specifications for enterprise application integration and service-oriented architecture can be designed to connect many different computer network elements. Such specifications include Business Application Programming Interface, Web Services Interoperability, and Java EE Connector Architecture.

In various embodiments, the computer systems, data storage media, or modules described herein may be configured and/or programmed to include one or more of the above-described electronic, computer-based elements and components, or computer architecture. In addition, these elements and components may be particularly configured to execute the various rules, algorithms, programs, processes, and method steps described herein.

Implementations of the disclosure and all of the functional operations provided herein can be realized in digital electronic circuitry, or in computer software, firmware, or hardware, including the structures disclosed in this specification and their structural equivalents, or in combinations of one or more of them. Implementations of the disclosure can be realized as one or more computer program products, i.e., one or more modules of computer program instructions encoded on a computer readable medium for execution by, or to control the operation of, a data processing apparatus. The computer readable medium can be a machine-readable storage device, a machine readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions or computer program products and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. These may also be referred to as computer readable storage media. The processor and the memory can be supplemented by, or incorporated in, special purpose logic circuitry.

To provide for interaction with a user, implementations of described herein can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the disclosure can be realized in a computing system that includes a back end component, e.g., as a data server, or that includes a middleware component, e.g., an application server, or that includes a front end component, e.g., a client computer having a graphical user interface or a Web browser through which a user can interact with an implementation of the present disclosure, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this disclosure contains many specifics, these should not be construed as limitations on the scope of the disclosure or of what may be claimed, but rather as descriptions of features specific to particular implementations of the disclosure. Certain features that are described in this disclosure in the context of separate implementations can also be provided in combination in a single implementation. Conversely, various features that are described in the context of a single implementation can also be provided in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

While various embodiments have been described herein, it should be apparent, however, that various modifications, alterations and adaptations to those embodiments may occur to persons skilled in the art with the attainment of some or all of the advantages of the invention. The disclosed embodiments are therefore intended to include all such modifications, alterations and adaptations without departing from the scope and spirit of the invention. Accordingly, other embodiments and implementations are within the scope of the following claims. For example, the actions recited in the claims can be performed in a different order and still achieve desirable results.

What is claimed is:

1. A computer-implemented method for updating a data catalog, comprising:

initiating cataloging, in response to creation of a current backup that has been successfully created;

accessing the current backup archive of a file system, wherein the current backup archive comprises the data catalog and a Master File Table (MFT), wherein the data catalog comprises a tree structure of folders and files, wherein the MFT is stored within a reserved portion of the current backup archive of the file system;

instead of accessing the tree structure of the data catalog, obtaining access to the MFT of the current backup archive and an MFT of a previous backup archive, wherein each MFT comprises file system metadata existing at a time of each respective backup, wherein the metadata comprises a list of files and file attribute information, including whether a file of the list of files was modified, wherein each MFT is a cached version thereof created during backup;

comparing each entry in the MFT of the current backup to each entry of the MFT of the previous backup to identify one or more differences in the current backup archive; and saving one or more of the differences into the data catalog of the current backup archive, wherein the one or more differences comprises file attributes and files that were created, updated, and deleted between current backup archive and previous backup archive.

2. The method of claim 1 further comprising generating a list of files that are new, deleted, and/or changed in the MFT of the current backup as compared to the MFT of the previous backup using the one or more differences.

3. The method of claim 1 further comprising copying a catalog of previous backup archive to the catalog of current backup archive.

4. The method of claim 1 further comprising retrieving a list of files and file attributes from the MFT of previous backup archive and retrieving a list of files and file attributes from the MFT of the current backup archive.

5. The method of claim 1 further comprising determining whether files in the MFT of previous backup archive do not exist on the MFT of current backup archive.

6. The method of claim 4 further comprising deleting from the data catalog files in the MFT of previous backup archive do not exist on the MFT of current backup archive.

7. The method of claim 1 further comprising the determining whether files in the MFT of current backup archive do not exist on the MFT of previous backup archive.

8. The method of claim 6 further comprising writing to the catalog files in the MFT of current backup archive that do not exist on the MFT of previous backup archive.

9. The method of claim 1 further comprising determining whether files exist in both the MFT of current backup archive and the MFT of previous backup archive.

10. The method of claim 8 further comprising comparing the attributes of files that exist in both the MFT of the current backup archive and the MFT of the previous backup archive.

11. The method of claim 9 further comprising writing files with attributes that are different in the MFT of the current backup archive as compared to the attributes for the same file in the MFT of the previous backup archive to the data catalog.

12. The method of claim 1 wherein the current backup archive was previously generated by a third party application.

13. The method of claim 1, wherein the comparing comprises comparing cached versions of the MFTs created during backup.

14. A computer-implemented method for updating a data, comprising:
  accessing a current disk-level backup archive, wherein the current disk-level backup archive comprises the data catalog and a Master File Table (MFT), wherein the data catalog comprises a tree structure of folders and files, wherein the MFT is stored within a reserved portion of the current disk-level backup archive of the file system;
  instead of accessing the tree structure of the data catalog, obtaining access to the MFT of the current disk-level backup archive and an MFT of a previous disk-level backup archive, wherein each MFT comprises file system metadata existing at a time of each respective backup, wherein the metadata comprises a list of files and file attribute information, including whether a file of the list of files was modified;
  comparing one or more hash records obtained from the MFT of the current disk-level backup archive to one or more hash records obtained from the MFT of the previous disk-level backup archive to identify one or more differences in the current disk-level backup archive;
  saving one or more of the differences into the data catalog of the current disk-level backup archive, wherein the one or more differences comprises file attributes and files that were created, updated, and deleted between current backup archive and previous backup archive;
  splitting the MFTs into corresponding split regions;
  comparing hash records of the split regions of the MFT of the current backup with the corresponding hash records of the split regions of the MFT of the previous backup; and
  performing a later full comparison of the corresponding split regions with subsequently changed hashes.

15. A computer-implemented method for updating a data catalog, comprising:
  initiating disk cataloging, in response to creation of a current disk-level backup;
  accessing the current disk-level backup archive of a file system, wherein the current disk-level backup archive comprises the data catalog and an inode table, wherein the data catalog comprises a tree structure of folders and files, wherein the inode table is stored within a reserved portion of the current disk-level backup archive of the file system;
  obtaining access to the inode table of the current disk-level backup archive and an inode table of a previous disk-level backup archive, wherein each respective inode table includes file system metadata existing at a time of each respective backup, wherein the metadata comprises a list of files and file attribute information, including whether a file of the list of files was modified, wherein each inode table is a cached version thereof created during backup;
  comparing each entry in the inode table of the current backup to each entry of the inode table of the previous backup to identify one or more differences in the current backup archive; and
  saving one or more of the differences into the data catalog of the current disk-level backup archive, wherein accessing files and folders of tree structure is avoided, wherein the one or more differences comprises file attributes and files that were created, updated, and deleted between current backup archive and previous backup archive.

16. A computer-implemented method for updating a data catalog, comprising:
  accessing a current file-level backup archive of a file system, wherein the current file-level backup archive comprises the data catalog and an inode table, wherein the data catalog comprises a tree structure of folders and files, wherein the inode table is stored within a reserved portion of the current file-level backup archive of the file system;
  instead of accessing the tree structure of the data catalog, obtaining access to the inode table of the current file-level backup archive and an inode table of a previous backup archive, wherein each respective inode table includes file system metadata existing at a time of each respective backup;
  comparing one or more hash records obtained from the inode table of the current file-level backup to one or more hash records obtained from the inode table of the previous file-level backup to identify one or more differences in the current file-level backup archive; and
  saving one or more of the differences into the data catalog of the current file-level backup archive, wherein the one or more differences comprises file attributes and files that were created, updated, and deleted between current backup archive and previous backup archive;
  splitting the inode table into corresponding split regions;
  comparing hash records of the split regions of the inode table of the current backup with the corresponding hash records of the split regions of the inode table of the previous backup; and performing a later full comparison of the corresponding split regions with subsequently changed hashes.

* * * * *